United States Patent [19]
Borkowski

[11] 3,958,674
[45] May 25, 1976

[54] HOLD-DOWN DEVICE FOR A DRUM BRAKE

[75] Inventor: Donald F. Borkowski, South Bend, Ind.

[73] Assignee: The Bendix Corporation, South Bend, Ind.

[22] Filed: June 6, 1975

[21] Appl. No.: 584,308

[52] U.S. Cl. ................................. 188/340; 29/407
[51] Int. Cl.$^2$ ........................................ F16D 65/08
[58] Field of Search ............ 188/325, 326, 327, 328, 188/329, 330, 331, 332, 333, 334, 335, 340, 341, 250 R, 250 A, 250 B, 250 H; 29/407

[56] References Cited
UNITED STATES PATENTS

| | | | |
|---|---|---|---|
| 1,875,029 | 8/1932 | La Brie | 188/332 |
| 1,908,459 | 5/1933 | Thomas | 188/250 A |
| 2,666,504 | 1/1954 | Berno et al. | 188/333 |
| 3,294,201 | 12/1966 | Swift | 188/340 |
| 3,308,909 | 3/1967 | Johannesen | 188/340 |
| 3,517,779 | 6/1970 | Bolenbaugh | 188/329 |
| 3,606,666 | 9/1971 | Briggs | 29/407 |

Primary Examiner—Trygve M. Blix
Assistant Examiner—Edward R. Kazenske
Attorney, Agent, or Firm—Ken C. Decker; William N. Antonis

[57] ABSTRACT

A drum brake is disclosed in which a pair of arcuate brake shoes are slidably mounted on a fixed support and which are thrust into braking engagement with a rotating drum by a fluid motor actuator. Resilient hold-down springs are provided to attach the brake shoes to the drum and consist of an anchor portion which is engaged with the fixed support and a linking portion which interconnects the anchor portion and the brake shoe. A detent is provided on the web of the brake shoe in a position such that, when the brake shoe is installed on the fixed support with the detent projecting away from the fixed support, the linking portion of the hold-down spring will engage the detent and cannot be connected to the anchor portion. In this way, the shoes must be installed correctly with the projections facing towards the fixed support in order to connect the portions of the hold-down springs, thereby preventing incorrect assembly of the brake.

6 Claims, 3 Drawing Figures

HOLD-DOWN DEVICE FOR A DRUM BRAKE

BACKGROUND OF THE INVENTION

This invention relates to a drum brake assembly.

Drum brakes have been manufactured for many years, and normally include arcuate primary and secondary brake shoes which are similar in appearance to one another, but are designed to function differently. In many brake designs, each of the primary and secondary brake shoes will fit in the position normally occupied by the other shoe by merely turning the brake shoe over. However, because of the difference in design, in this manner the effectiveness of the brake may be substantially reduced if the brake shoes are not installed correctly. It is also common practice to provide resilient hold-down springs to attach the brake shoes to the fixed support.

Therefore, one of the principle objects of my invention is to design a brake shoe and hold-down spring associated therewith such that the hold-down spring cannot be installed upon the fixed support unless the brake shoes are installed in their proper positions.

Another important object of my invention is to provide a projection or detent on one side of the web of the brake shoe, so that when the brake shoes are installed correctly, the detent faces the fixed support, and when the brake shoes are installed incorrectly, the projection engages the coiled portion of the hold-down spring thereby holding it away from the brake shoe and the fixed support.

DETAILED DESCRIPTION

Figure 1:
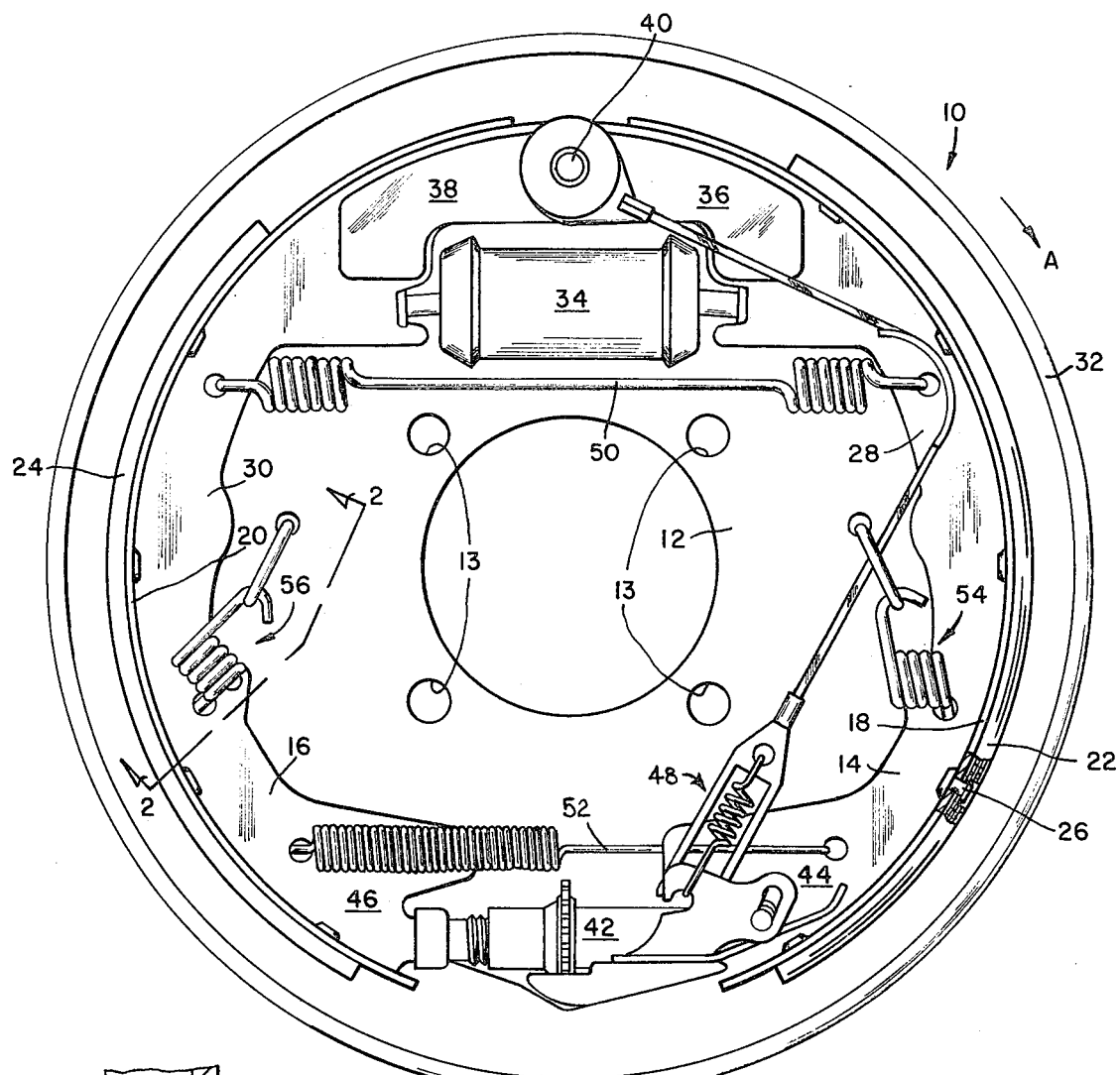
FIG. 1 is a side elevational view of a drum brake made pursuant to the teachings of my present invention.

Referring now to the drawings, a drum brake generally indicated by the numeral 10 includes a fixed supporting plate 12 which is bolted to a fixed or non-rotative portion of the vehicle, such as the axle flange, by bolts (not shown) inserted through openings 13, in the backing plate 12. A pair of brake shoes 14, 16 are slidably mounted on the backing plate 12, and include arcuate portions 18, 20, to which friction linings 22, 24 are secured in any appropriate manner, such as by rivets 26. The brake shoes 14 and 16 further include web sections 28, 30 which are perpendicular to their corresponding arcuate sections 18, 20, so that the brake shoes 14 and 16 have a generally T-shaped cross section. When a brake application is effected, the brake shoes 14, 16 are thrust into frictional engagement with the rotating drum 32 by a fluid motor actuator 34 of any suitable type well known to those skilled in the art, and which is located between the ends 36, 38 of the brake shoes 28, 30. One of the brake shoes 14 or 16 is adapted to anchor against an anchor pin 40, which is secured to the backing plate 12, depending upon the direction of drum rotation, when a brake application is effected. An adjusting strut 42 is located between the other ends 44, 46 of the brake shoes 14 and 16, respectively. An automatic adjustment mechanism generally indicated by the numeral 48 is provided to operate the strut 42 to thereby further separate the shoes thus bringing them closer to the drum 32 when a sufficient number of brake applications has worn away a predetermined portion of the friction material 22, 24. The adjusting strut 42 and automatic adjusting mechanism 48 are more completely disclosed in U.S. Pat. No. 3,217,533, owned by the assignee of the present invention, and incorporated herein by reference. These elements form no part of the present invention, and they will not be described in detail herein. The brake 10 further includes resilient return springs 50, 52 interconnecting the shoes 14 and 16 to urge the latter away from the drum 32 when the brake is released.

Figure 2:
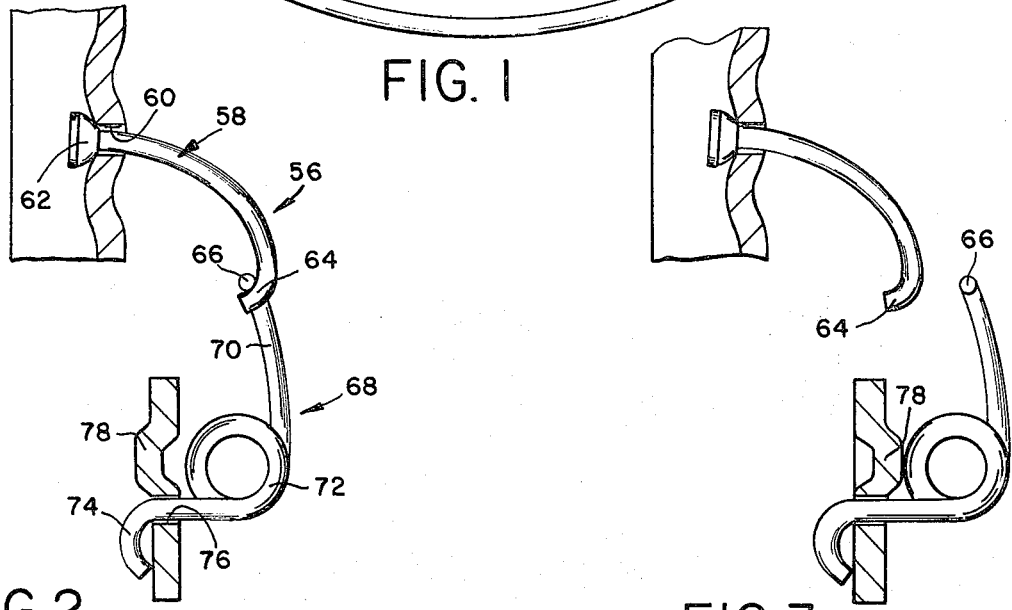
FIG. 2 is a cross-sectional view taken substantially along lines 2—2 of FIG. 1 and which illustrates the relative positions of the brake shoe and hold-down spring when the brake is assembled correctly.
Figure 3:
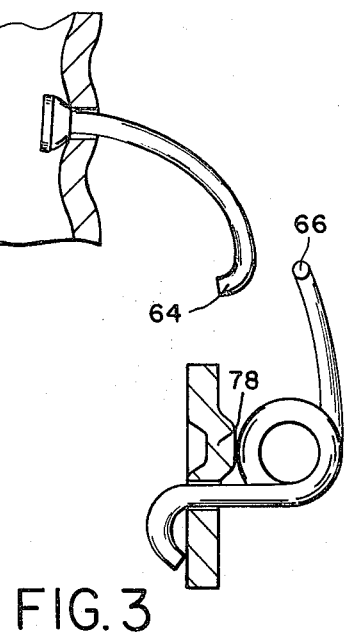
FIG. 3 is a view similar to FIG. 2, but which illustrates the relative positions of the brake shoe and hold-down spring when the brake shoe is installed incorrectly.

Hold-down springs generally indicated by the numerals 54 and 56 are provided to attach the brake shoes 14 and 16 to the anchor plate 12. Each of the hold-down springs 54 and 56 include an anchor portion 58 which extends through an opening 60 provided in the anchor plate 12 and which terminates in an enlarged head 62. The anchor portion 58 is curved, and terminates in a hood 64 which is adapted to engage a corresponding hook 66 defined on a linking portion of the hold-down springs generally indicated by the numeral 68. The linking portion 68 includes an arm 70 which extends from the hook 66 and terminates in a coiled portion 72. Another hook 74 extends from the coiled portion 72 through an aperture 76 provided in the web of the brake shoes 14 and 16, to thereby attach the linking portion 68 to the brake shoes. The webs 28, 30 of the brake shoes 14 and 16 are provided with detents or projections 78 which are located beneath the coiled portion 72 of the hold-down springs. As is illustrated in FIG. 2, when the hold-down springs and their corresponding brake shoes 14, 16 are correctly installed on the backing plate 12, the projections 78 face away from the coiled portion 72 of the hold-down springs, thereby permitting the hooks 66 of the linking portions 68 to engage their corresponding hooks 64 on the anchor portions 58. However, when the brake shoes are installed such that the projections 78 face toward the coiled portion 72, as is best illustrated in FIG. 3, the hook 66 is held away from the hook 64, thereby preventing their engagement, and thereby preventing an incorrect assembly of the brake 10.

MODE OF OPERATION

When a brake application is effected, the fluid motor actuator 34 thrust the ends 36, 38 of the brake shoes 14 and 16 apart, thereby engaging the friction material 22, 24 with the rotating drum 32. The brake shoes rotate as a unit with the drum, and assuming rotation of the drum in the direction indicated by the arrow A, the end 38 of the brake shoe 30 will anchor against the anchor pin 40. Consequently, the torque generated by engagement of the brake shoe 16 with the drum 32 will be taken directly by the anchor pin 40, and the torque generated by engagement of the brake shoe 14 with the drum 32 will be transmitted through the adjuster strut 42 to the brake shoe 16 and will be transmitted through the brake shoe 16 to the anchor pin 40. When a brake application is released, the resilient return springs 50 and 52 urge the brake shoe away from the drum 32, toward the position illustrated in the drawings.

As is well known to those skilled in the art, and as has been discussed briefly hereinabove, repeated brake applications will cause the friction material 22, 24 mounted on the brake shoes 14 and 16 to wear away. Consequently, the automatic adjustment mechanism 48 has been provided to operate strut 42 to move the brake shoes 14, 16 further apart (and, consequently, closer to the drum 32) to compensate for this wear. However, after the brake 10 has been used for a period of time, the friction material 22, 24 will have worn down to the rivets 26, and consequently must be replaced. Customarily, the vehicle owner will then have the brake shoes 14, 16 replaced or relined at a local service facility.

It will be noted that the brake shoes 14 and 16 are quite similar in appearance. However, they are designed quite differently, and the braking performance of the brake 10 will be greatly reduced if the brake shoes 14 and 16 are interchanged, which is possible in prior art brakes, since the brake shoes 14 and 16 will engage all of the other component parts of the brake 10 if shoes 14, 16 are installed in either position. In order to reverse the positions of the brake shoes 14 and 16, it is necessary to turn both of the brake shoes over. Consequently, the projections 78 have been provided on the brake shoes 14 and 16, which, when the brake shoes are installed in their proper position, face towards the anchor plate 12, and permit the portions 58, 68, of the hold-down springs 54, 56 to be installed in their proper positions for proper operation of the brake as is clearly illustrated in FIG. 2. However, when the brake shoes 14 and 16 are reversed, the projection 78 projects away from the anchor plate 12, as is best illustrated in FIG. 3. Therefore, the projection 78 engages the coiled portion 72 of the hold-down springs 54, 56 thereby preventing engagement of the hooks 64 and 66. Consequently, since the hold-down springs 54 and 56 cannot be connected when the brake shoes 14, 16 are installed in their incorrect position, the mechanic servicing the brakes must then reverse the shoes and install them in their correct position.

I claim:
1. In a brake: a rotating drum, a stationary support member mounted adjacent said drum, a pair of brake shoes slidable on said support member and movable toward and away from frictional engagement with said drum, means for urging said brake shoes into frictional engagement with said drum when a brake application is effected, first resilient means yieldably urging said brake shoes away from said drum, second resilient means interconnecting said brake shoes and said support member to yieldably mount said brake shoes on said support member, said second resilient means including an anchor portion adapted for connection to said support member and a linking portion connecting with a corresponding brake shoe, said linking portion being joined with said anchor portion, and a detent carried by said corresponding brake shoe for preventing connection of the anchor portion and the linking portion by holding said linking portion away from said anchor portion when said corresponding brake shoe is improperly installed on said support member.

2. The invention of claim 1:
said brake shoes having a generally T-shaped cross section to present an arcuate friction material receiving surface for engagement with said drum and a web, said detent projecting from one side of said web to hold said linking portion away from the anchor portion when the linking portion is installed on the side of said web from which said detent projects.

3. The invention of claim 2:
said linking portion having a coiled section and an arm extending from said coiled section for engagement with said anchor portion, said detent engaging said coiled section to hold said arm away from the anchor portion when the linking portion is installed on said web with said coiled section disposed adjacent said one side of said web of the corresponding brake shoe.

4. The invention of claim 3:
the other side of said web being substantially flat so that said arm can engage said anchor portion when the linking portion is installed on said web with the coiled section disposed adjacent the other side of the web of the corresponding brake shoe.

5. The invention of claim 4:
said web defining an aperture therein adjacent said detent, and a hook section extending from said coiled section, said hook section extending through said aperture to engage the opposite side of the web opposite the side adjacent which the coiled section is disposed to thereby retain said linking portion on said corresponding brake shoe.

6. The invention of claim 5:
said arm and said anchor portion terminating in hooked-shaped portions so that the anchor portion may be joined to said linking portion when the latter is properly installed on said web of said corresponding brake shoe.

* * * * *